United States Patent Office 3,662,049
Patented May 9, 1972

3,662,049
ORIENTED ARTICLES FROM RETRACTED BLANK
Dixie E. Gilbert, Bartlesville, Okla., assignor to
Phillips Petroleum Company
Filed Nov. 13, 1969, Ser. No. 876,309
Int. Cl. B29c 17/07, 17/14, 25/00
U.S. Cl. 264—89
12 Claims

ABSTRACT OF THE DISCLOSURE

A parison or other preform blank is heated to orientation temperature, stretched, allowed to contract, and restretched prior to introduction of fluid pressure to expand same out into conformity with a mold zone. Improved clarity and strength are achieved utilizing this technique.

BACKGROUND OF THE INVENTION

This invention relates to the formation of biaxially oriented hollow articles.

While patents in the blow molding art go back over 100 years, it has only been in the last dozen years that blow molding techniques have achieved significant commercial success. Very recently, techniques have been developed for producing high strength, clear articles by stretching a parison preform at orientation temperature. Such techniques are disclosed in Wiley, U.S. 3,288,317, and Turner et al., U.S. 3,390,426, for instance.

SUMMARY OF THE INVENTION

It is an object of this invention to produce molecularly oriented hollow articles of increased strength over that normally obtained by orientation; and It is a further object of this invention to produce oriented hollow articles of improved clarity.

In accordance with this invention, a parison or other preform blank is stretched at orientation temperature, allowed to retract, restretched and expanded to conform to a mold zone. Surprisingly, it has been found that the step of allowing the parison to relax further enhances the strength and clarity normally achieved by orientation.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
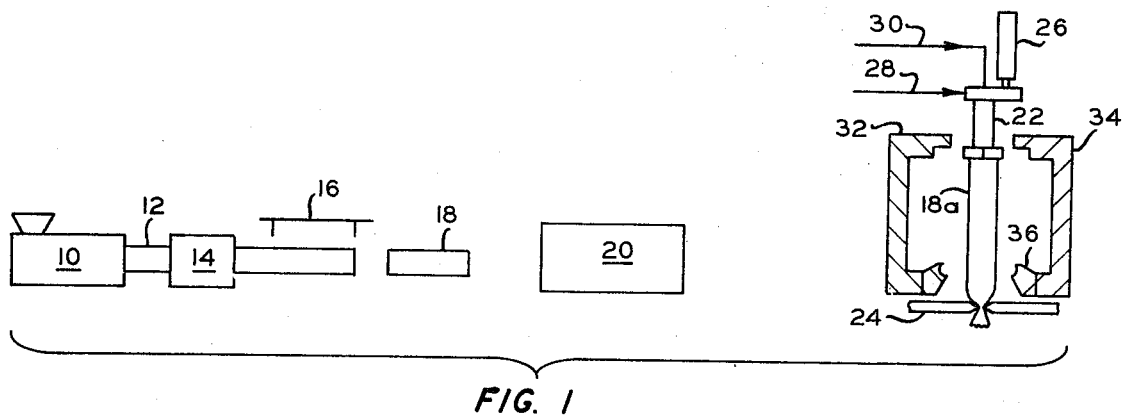
FIG. 1 is a schematic representation of a blow molding apparatus suitable for carrying out the instant invention.

The instant invention is applicable for the formation of any hollow article such as bottles, lampshades, toys, and the like.

The blanks suitable for use in the instant invention can be made of any orientable thermoplastic material such as polyolefins, nylon, polystyrene, ABS and other butadiene-styrene containing copolymers, poly(vinyl chloride), polyvinylidene chloride polymers and copolymers, and the like. Preferred materials are crystalline polymers such as polymers of at least one mono-1-olefin having 2-8 carbon atoms per molecule, more preferably polymers and copolymers of ethylene, propylene, and butene, most preferably polypropylene.

In the case of tubular parison preforms, they can be formed by any means known in the art, such as injection molding, although the preferred means is to simply extrude a tube or pipe in a manner conventional in the art and thereafter sever this continuous extrudate into workpieces of the desired length. In an alternate embodiment, the blank can be a preformed disc or sheet adapted to thermoforming.

The parison or other preform blanks must be heated to orientation temperature preparatory to the first stretching operation. Generally, the stretching operation will be carried out at ambient temperature; however, since the sequence of steps of stretching, relaxing, and restretching are carried out one immediately after the other, the parison or other preform blank will remain at orientation temperature throughout the stretching and expanding operations. By orientation temperature, it is meant that temperature at which polymers on stretching exhibit an increase in strength. For crystalline polymers such as polymers of mono-1-olefins having 2–8 carbon atoms per molecule, this temperature is generally in the range of 1–50, preferably 5–25° F., below the crystalline melting point thereof. The crystalline melt point can be determined by placing a small sample of the material to be tested on a heating stage of a polarizing microscope and recording the crystalline melting point as that temperature at which the last birefringence disappears on slow heating. Since the parison preform must be in the solid state to be at orientation temperature, it is preferred to cool the parison and reheat it to orientation temperature. This reheating operation can be done in an air oven, liquid bath, a heating block, or by subjecting the parisons to radiant heat, or any other suitable means.

The term "crystalline" is utilized in this specification in the sense conventional in the industry to describe a material which is substantially crystalline, that is, a material having about 50% or more crystallinity under normal conditions.

It was completely unexpected to find that the increase in strength and improvement in clarity normally associated with orientation could be further enhanced by the technique of the instant invention whereby the parison or other preform blank is caused to retract and then restretched. It has been found that at the orientation temperature, crystalline polymers in particular such as polypropylene exhibit characteristics more like rubber and thus will retract when the tension creating the stretching is released.

Indeed, tubular parisons of crystalline polymer such as polypropylene stretched axially at this temperature will retract back to essentially their original length immediately upon release of the axial tension utilized to effect the stretching. Some beneficial effect can be achieved, however, simply by releasing the tension a sufficient amount for the parison to retract only a very small amount. Thus, in the case of tubular parisons, it is within the scope of the invention to allow the parison to retract an amount equal to between 1 and 100, preferably 50 to 99, percent of the increase in length effected by the initial stretching. Generally, the second stretching operation will be carried out so as to stretch the parison back to the initial maximum length achieved in the first stretching operation, although it is within the scope of the invention to stretch the parison a greater or a lesser amount the second time. In any event, the longitudinal stretch ratio for each stretch should be in the range of 1.1:1 to 8:1, preferably 1.5:1 to 2.5:1. By longitudinal stretch ratio is meant the ratio of the length of the portion being stretched (i.e., the portion of the parison between the gripping means) after stretching to its length before stretching. A ratio of 1:1 would indicate no affirmative stretching.

With tubular parisons, it is preferred to preblow the parison slightly prior to closing the mold and introducing the main blow fluid. In the event that the parison is an open end parison which is to be closed by the action of the mold parts coming together and pinching off one end, some means must be provided to close off the open end in order to effect the preblow. The parison can be gripped at each end, as shown in the drawings, to effect the stretching or in the event a closed end parison is utilized, an interal rod having a tamping foot at the end thereof can be utilized to hold the bottom end of the parison against a backup means while the parison is stretched by means of a gripping jaw pulling at the other end. Where preblow fluid is utilized, it must be introduced under greater pressure than the 3–6 p.s.i. normally used for preblowing conventional blow molding operations in which a molten parison is used. Preblow pressure of at least 25 p.s.i.g. is preferred with a range of 25–50 p.s.i.g. being entirely satisfactory. Alternatively, by controlling the rate of introduction or the timing of the preblow introduction, the same source of fluid can be used for the preblow as is utilized in the main blow. For example, fluid under pressure of 80–150 p.s.i.g. can be admitted to preblow the parison just as the mold halves begin to close. Without ever interrupting the flow, the parison will be preblown just as the molds close, and thereafter, the fluid pressure expands the parison into conformity with the mold. The main blow fluid is preferably air at a pressure of 60–200, preferably 90–150 p.s.i.g.

Referring now to the drawings, particularly FIG. 1, there is shown a conventional extruder 10 for forming a tubular extrudate 12. Molten tubular extrudate 12 passes immediately into vacuum cooling and sizing chamber 14. The solidified tubular extrudate then passes from sizing chamber 14 to cutting means 16 where it is severed into individual open end parison preforms 18. Parison preforms 18 pass through air oven 20 where they are heated to orientation temperature. They are then transferred by means not shown to thread-forming head 22. Thread-forming head 22 can, for instance, be identical to that shown in Turner et al. referred to hereinabove, the disclosure of which is hereby incorporated by reference. Parison 18 is grasped at the other end thereof by gripping fingers 24 which are brought together by means of air cylinders or cams not shown, and relative movement effected between thread-forming head 22 and gripping fingers 24 by means of raising head 22 through the action of cylinder 26 to stretch the parison to the elongated position depicted by reference character 18a. Preblow air is introduced through line 28 and main blow air through line 30. Mold halves 32 and 34 have inserts 36 which cooperate to seal the parison when the mold halves close.

Figure 2:
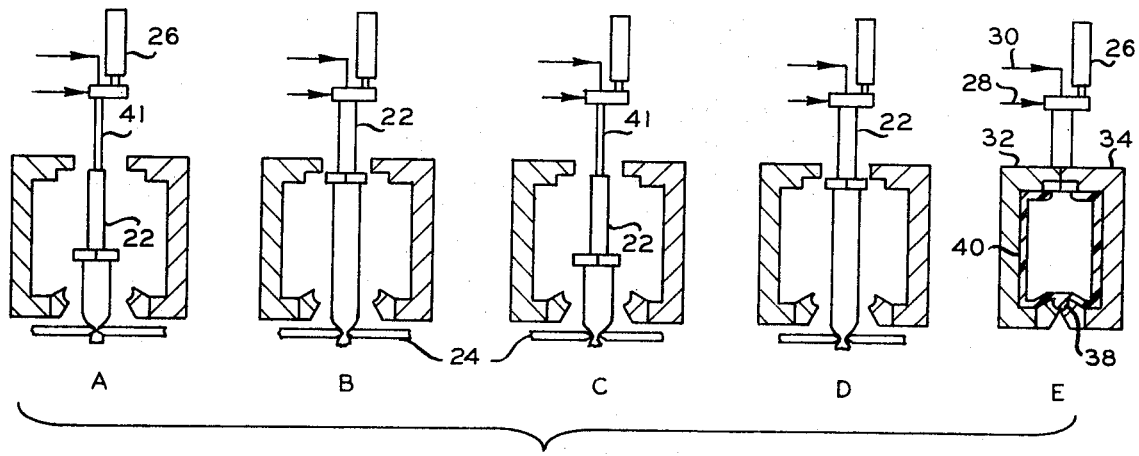
FIG. 2 is a series of views showing the manipulative steps carried out on the parison.

Referring now to FIG. 2, there is shown in view A the parison as it is initially grasped by the thread-forming head 22 and gripping fingers 24. In view B, there is shown the condition of the parison at the termination of the initial stretching operation. Thereafter, the axial tension on the parison is released, allowing thread-forming head 22 to retract so that the parison relaxes back to essentially its original length, as shown in view C. Thereafter, the parison is restretched, as shown in view D, to the same length as in the initial stretch. View E shows the operation after the mold halves 32 and 34 have closed sealing and pinching off parison in area 38; the parison has then expanded out into conformity with the mold walls to form the resulting article 40 by means of fluid pressure introduced through lines 28 and 30. As can be seen from FIG. 2, thread-forming head 22 moves up and down on shaft 41 by means of a hydraulic arrangement activated by cylinder 26.

Figure 3:
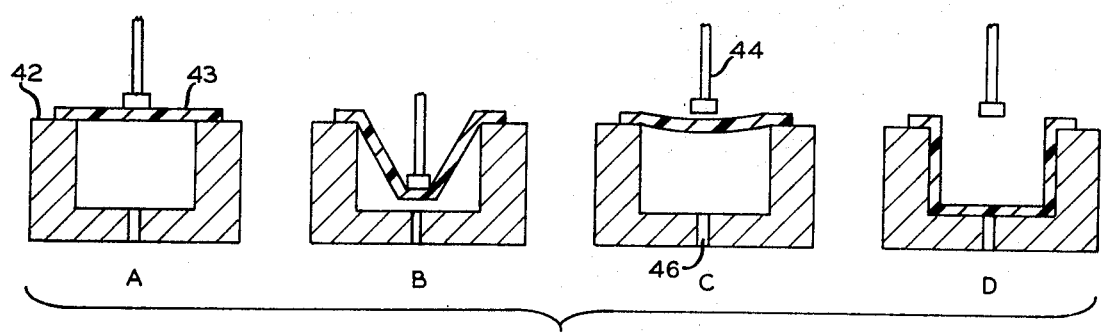
FIG. 3 is a series of views representing an alternative embodiment of the invention.

In FIG. 3, there is shown an alternative embodiment. A sheet of thermoplastic material 43 at orientation temperature is positioned over thermoforming mold 42, as shown in view A. Plug assist 44 descends to stretch the sheet as shown in view B. Immediately thereafter, plug assist 44 is retracted and the thermoplastic material allowed to retract as shown in view C. Then the sheet is caused to conform to the shape of the mold wall to form a hollow closed-end article by means of a vacuum pulled through line 46 and/or internal fluid pressure. The plug assist is preferably used to restretch the parison the second time prior to the creation of a pressure differential to expand same out into conformity with the mold walls as shown in view D. As with tubular parisons, the plastic is allowed to retract an amount equal to 1–100, preferably 50–99, percent of the original stretch.

In the above drawings, many conventional parts such as heaters, temperature controllers, frames, cooling channels, and the like have been omitted for the purpose of simplicity but their inclusion is understood by those skilled in the art and is within the scope of the invention.

EXAMPLE

Propylene homopolymer having a density of 0.905 (ASTM D1505–63T), a melt flow of 2 (ASTM D1238–62T, Condition L), and a crystalline melting point of about 340° F. was extruded into tubing having an outside diameter of 1.150-inch and a wall thickness of 0.150-inch. The tubing was cooled to room temperature in a vacuum sizing and quenching chamber and cut into 7-inch lengths. These 7-inch lengths were heated to a temperature of about 320° F., and inserted into thread-forming jaws similar to those shown in the drawings. The parison was restrained at the other end thereof and stretched to about twice its original length and immediately allowed to relax back to essentially its original length. It was then immediately restretched, again to about twice its original length. A mold was then closed on the restretched parison and internal fluid pressure introduced to form a 22-ounce bottle with 33 mm. threads.

A number of such bottles were formed in this manner and compared with bottles formed in an identical manner except with only a single stretching. Visual examination indicated that the bottles formed in accordance with the invention were unexpectedly clearer than the biaxially oriented bottles formed with only a single stretch. In addition, tensile samples were cut from the side walls of the bottles and made in accordance with the invention and compared with bottles made in an identical manner from identical polymer except with only a single stretch. Surpisingly, there was about a 430 p.s.i. improvement in tensile strength for the bottles made utilizing the invention, even though the parisons at the time they were blown were stretched to the same amount, that is, to twice their original length. This result was unexpected and no explanation is readily apparent. The samples were taken out of the flat side in a longitudinal direction and the sample from the bottle made in accordance with the invention had a tensile strength of 11,540 p.s.i. compared with 11,110 p.s.i. for the bottle from a parison stretched only once.

While this invention has been described in detail for the purpose of illustration, it is not to be construed as limited thereby, but is intended to cover all changes and modifications within the spirit and scope thereof.

I claim:

1. A process for forming an oriented hollow article comprising:
   heating a blank of an orientable thermoplastic polymer, which blank is in the solid state, to a temperature at which orientation occurs on stretching;
   thereafter stretching said thus heated blank;
   thereafter allowing said thus stretched blank to retract;
   thereafter stretching said thus retracted blank for a second time; and
   thereafter expanding said blank out into conformity with a mold zone, said stretching, retracting, stretching said thus retracted blank, and expanding being carried out sequentially so that said blank remains at orientation temperature throughout these operations.

2. A method according to claim 1 wherein said thermoplastic polymer is a normally crystalline polymer which is at a temperature of 1–50° F. below the crystalline melting point of said polymer.

3. A method according to claim 2 wherein said blank is a tubular parison and said stretching is in the direction of the longitudinal axis of said parison.

4. A method according to claim 3 wherein the ratio of stretched to unstretched length for each of said longitudinal stretching steps is within the range 1.1:1 to 8:1.

5. A method according to claim 3 wherein the ratio of stretched to unstretched length for each of said longitudinal stretching operations is within the range of 1.5:1 to 2.5:1.

6. A method according to claim 3 wherein said parison is allowed in said retracting step to retract an amount equal to 50 to 99 percent of the increase in length effected by said stretching prior to said retracting.

7. A method according to claim 3 wherein said parison is formed by extruding a continuous length of tubing, cutting said length into individual workpieces, and reheating.

8. A method according to claim 3 wherein said parison is preblown slightly before a molding zone is closed thereabout.

9. A method according to claim 3 wherein said crystalline polymer is a polymer of at least one mono-1-olefin having 2–8 carbon atoms per molecule.

10. A method according to claim 3 wherein said polymer is polypropylene.

11. A method according to claim 3 wherein said hollow article is a bottle.

12. A method according to claim 11 wherein said polymer is polypropylene and the ratio of stretched to unstretched length for each of said longitudinal stretching operations is within the range of 1.5:1 to 2.5:1, said parison is allowed to retract in said retracting step to essentially its original length, and said parison is in the solid state at a temperature of 5–25° F. below the crystalline melting point thereof during said streching, retracting, and stretching after retracting.

References Cited
UNITED STATES PATENTS

| | | | |
|---|---|---|---|
| 3,426,754 | 2/1969 | Bierenbaum | 264—210 UX |
| 3,432,590 | 3/1969 | Papps | 264—210 |

ROBERT F. WHITE, Primary Examiner

J. R. THURLOW, Assistant Examiner

U.S. Cl. X.R.

18—5 BH; 264—96, 98, 150, 235, 342, 346